United States Patent
Brown et al.

(10) Patent No.: US 7,929,674 B1
(45) Date of Patent: *Apr. 19, 2011

(54) METHOD AND SYSTEM FOR PROVIDING BILLING CAPABILITY FOR A SERVICE NODE IN AN ADVANCED INTELLIGENT NETWORK ENVIRONMENT

(75) Inventors: Devinne H. Brown, Freehold, NJ (US); Hwey Chang, Morganville, NJ (US); Romel R. Khan, Eatontown, NJ (US); Michael Koptiw, Red Bank, NJ (US); Antoinette Rule, Trenton, NJ (US); Tejanand Sarju, Brooklyn, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/827,046

(22) Filed: Jul. 9, 2007

Related U.S. Application Data

(63) Continuation of application No. 11/215,714, filed on Aug. 30, 2005, now Pat. No. 7,257,208, which is a continuation of application No. 10/029,343, filed on Dec. 28, 2001, now Pat. No. 6,980,632.

(51) Int. Cl.
*H04M 15/00* (2006.01)
*H04M 3/42* (2006.01)

(52) U.S. Cl. ......... 379/114.28; 379/121.05; 379/202.01; 379/212.01

(58) Field of Classification Search ............. 379/114.23, 379/114.28, 121.01, 121.05, 126, 127.03, 379/127.06, 200.01, 202.11, 265.01, 266.01
See application file for complete search history.

(56) References Cited

U.S. PATENT DOCUMENTS

| 5,517,560 A | * | 5/1996 | Greenspan | 379/115.01 |
| 5,590,187 A | * | 12/1996 | Greenspan | 379/212.01 |
| 6,023,499 A | * | 2/2000 | Mansey et al. | 379/111 |

* cited by examiner

Primary Examiner — Binh K Tieu

(57) ABSTRACT

Embodiments of the present invention relate to billing for services in an Advanced Intelligent Network (AIN) environment. A first call is received at a service node from a service switching point located in the AIN. A second call is established through the service switching point to a called party. The first call is bridged with the second call and the bridged call is monitored for signaling information. The bridged call is processed based on the monitored signaling information. A billing module is created for the processed call at the service node. The billing module may include service values related to billing information for the processed call. The processed call may be merged back into the service switching point and the created billing module for the processed call may be sent to the service switching point for ultimate delivery to a billing system.

19 Claims, 4 Drawing Sheets

METHOD AND SYSTEM FOR PROVIDING BILLING CAPABILITY FOR A SERVICE NODE IN AN ADVANCED INTELLIGENT NETWORK ENVIRONMENT

This application is a continuation of prior application Ser. No. 11/215,714 filed Aug. 30, 2005, now U.S. Pat. No. 7,257,208 which is a continuation of prior application Ser. No. 10/029,343 filed Dec. 28, 2001 and issued as U.S. Pat. No. 6,980,632, both of which are incorporated herein by reference.

TECHNICAL FIELD

The present invention relates to telecommunications services. More specifically, this invention relates to providing complete and accurate billing for services that are provided in an Advanced Intelligent Network (AIN) environment.

BACKGROUND OF THE INVENTION

Interest in advanced intelligent networks (AINs) providing enhanced communications services has increased. Telecommunications service providers have begun to use equipment from multiple vendors to offer a variety of service features in an open-standard environment. Such features include call transfer, call conferencing, voice mail, call forwarding, caller ID, fax on demand, voice response services and many others.

The ability to provide enhanced features has come largely from the emergence of AIN. In order to connect to the AIN, intelligent AIN-compatible switches are used.

While there is significant enthusiasm to provide such enhanced features supported by the AIN, current AIN standards may not include methods that permit the recording and billing for features provided in a service node located in an AIN.

Accordingly, the need has arisen for a technology to provide recording and billing for AIN features provided by a service node.

SUMMARY OF THE INVENTION

Embodiments of the present invention relate to billing for services in an AIN environment. A first call is received at a service node from a service switching point located in the AIN. A second call is established through the service switching point to a called party. The first call is bridged with the second call and the bridged call may be monitored for signaling information. The bridged call is processed based on the monitored signaling information. A billing module is created for the processed call at the service node. The billing module includes service values related to billing information for the processed call. The processed call is merged back into the service switching point and the created billing module for the processed call is sent to the service switching point for ultimate receipt by a billing system.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
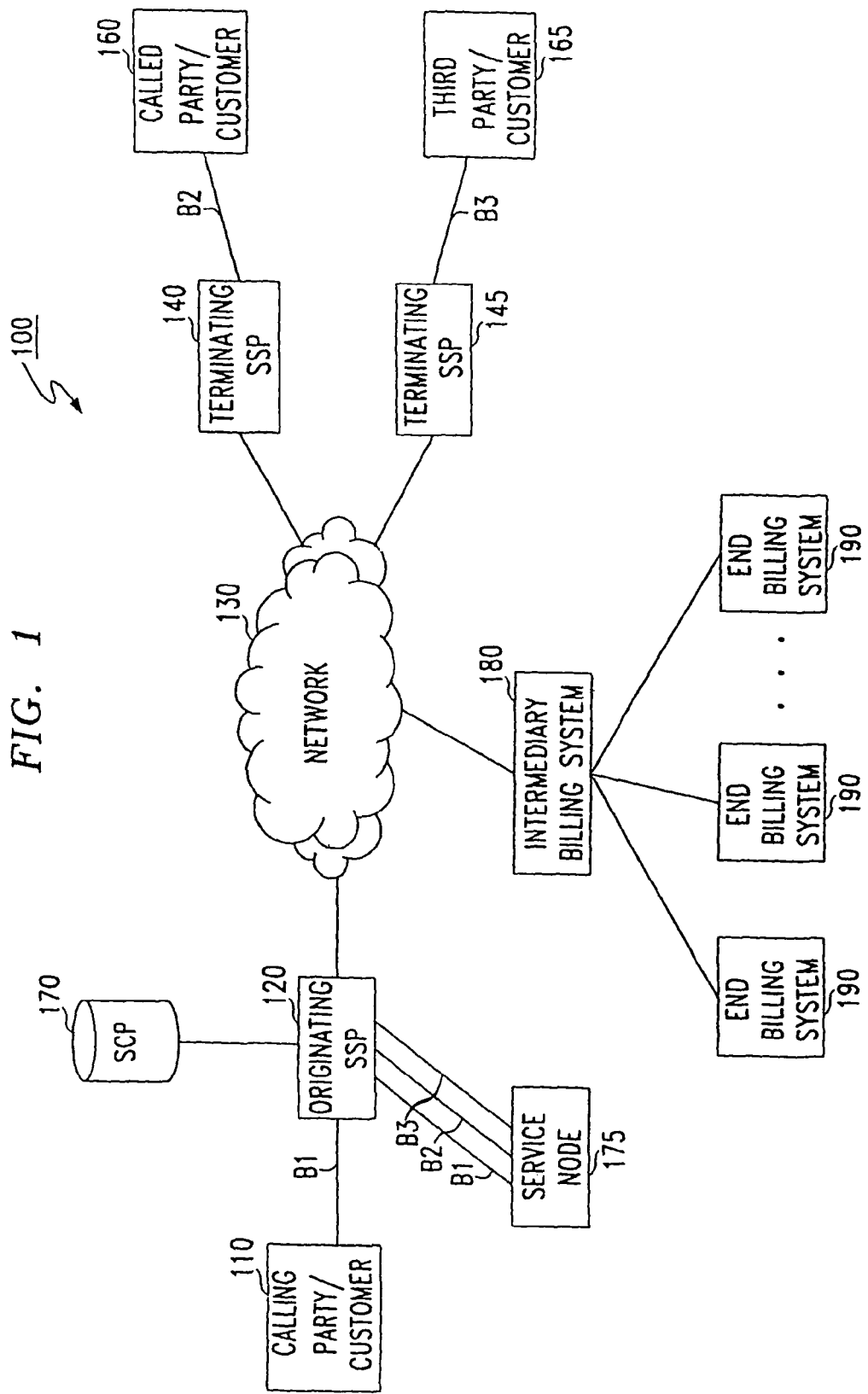
FIG. 1 is a block diagram of a communications system in accordance with an embodiment of the present invention.

FIG. 1 illustrates an exemplary communications system 100 according to an embodiment of the present invention. The communications system 100 includes elements of an AIN offering enhanced service features. A terminal device 110 belonging to a calling party/customer communicates with an originating service switching point (O-SSP) 120 connected to a transit network 130. The terminating service switching points (T-SSPs) 140, 145 are also connected to the transit network 130. The O-SSP 120 and the T-SSPs 140, 145 may be of the same type or may be of a different type and are collectively referred to herein as "SSPs." Connected to the T-SSPs are additional terminal devices, for example, the terminal devices 160 and 165. Terminal devices 160 and 165 belong to other customers. A service control point (SCP) 170 and a service node (SN) 175 are both connected to the O-SSP 120. It is recognized that the SSPs, SCPs, SNs, etc. may be located outside and/or inside the transit network 130. The communications system 100 may include additional components that are not shown in FIG. 1 for simplicity.

An intermediary billing systems 180 and/or an end billing systems 190 are coupled to the transit network 130. The billing systems 180 and/or 190 typically receive billing information from, for example, the O-SSP 120 or the T-SSP 140 for calls that have been completed. Based on the received billing information, the billing systems can generate bills that are sent to various customers.

The terminal devices 110, 160, and 165 can be any of a variety of device types such as a wired or wireless telephone, a one-way or two-way pager, a Personal Digital Assistant (PDA), a personal computer, or any other type of terminal device. The terminal devices 110, 160 and 165 communicate with each other through the O-SSP 120, the transit network 130 and the T-SSPs 140, 145.

The transit network 130 may include, for example, a public switched telephone network (PSTN), an Integrated Services Digital Network (ISDN), a cellular network, a digital mobile network, a Personal Communication Systems (PCS) network, a satellite network, an AIN, any suitable digital or analog network, any other suitable national and/or international communications network or any suitable combination thereof.

Typically, the SSPs 120, 140, 145 are digital telephone switches compatible with network 130 that operate in an open-standards environment such as an AIN. The SCP 170 typically comprises at least one database in which customer-specific information, used by the AIN to route calls, is stored. The SSPs 120, 140, 145 may be connected to the network 130 and/or the SCPs 170 using, for example, SS7 (Signal System 7), a T-1, T-3, ISDN Primary Rate Interface (PRI), ISDN Basic Rate Interface (BRI) or any other type of suitable communications channel and/or interface that includes signaling as well as data/voice connection.

The O-SSP 120 and the T-SSPs 140, 145 are switching centers that receive and deliver customer calls. Additionally, the SSP for example, the O-SSP 120—may further communicate with a SCP for example, the SCP 170—to request customer-specific instructions indicating how a call should be completed. The SSPs 120, 140, 145 typically utilize stored program control instructions to perform functions associated with toll calls and/or local calls.

Typically, each SSP has an interface with a SCP, the interface complying with Telcordia's (formerly Bellcore) GR1299 interface specification. The SSPs connect to the SN using National Integrated Services Digital Network Primary Rate Interface (NISDN PRI) based on the specification and/or ISUP (ISDN user part). The SN 175 contains service logic that allows complex customer interaction and/or offers support for enhanced features such as voice mail, call forwarding, caller ID, fax on demand, voice response services, conference calling, call forwarding and many others. In one example, the call transfer feature involves routing the call through the SN 175 to monitor in-band and/or out-of-band triggers from the called and/or calling parties. After the SN 175 has completed its function such as call transfer, the SN 175 can merge the call back to the SSP for bridging. The call merge feature can be accomplished via the NISDN 2-B channel transfer. After the call has been bridged back through the SSP 120, the SN 175 is no longer in the call path and its resources are free to handle other calls.

Note that while FIG. 1 merely shows three SSPs 120, 140 and 145, additional SSPs can be present as well. Although only one SCP 170 is shown, it is recognized that other SCPs may be distributed throughout the communications system 100. The SCP 170 typically contains customer records, command features, and other information for responding to database queries from the O-SSP 120, for example. The database 170 can communicate with the O-SSP 120 by any of a number of protocols including the SS7 protocol.

Although FIG. 1 only shows the terminal devices 110, 160, 165 connected to the O-SSP 120 and the T-SSP, respectively, additional terminal devices may be connected to the O-SSP 120 or the T-SSPs 140, 145.

Figure 2:
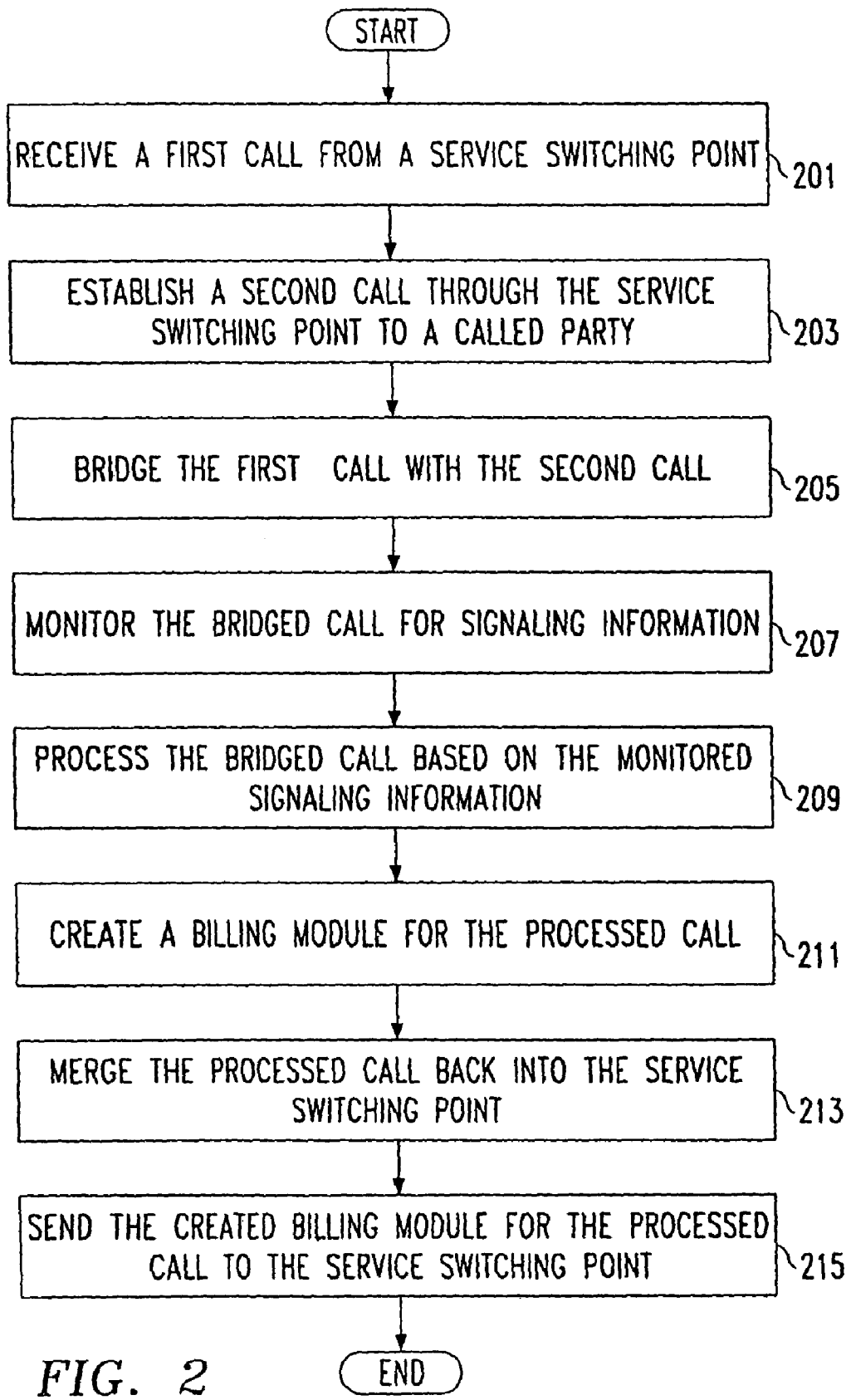
FIG. 2 is a flowchart illustrating the manner in which calls are processed in accordance with an embodiment of the present invention.

FIG. 2 is a flow chart describing an exemplary feature type being processed in accordance with an embodiment of the present invention. This flow chart of FIG. 2 describes the manner in which a SN may independently generate a billing record for a feature type, such as a call transfer feature, in an AIN environment.

In an exemplary embodiment of the present invention, the calling party/customer 110 places a call destined for a called party/customer 160. The customer call is received at an O-SSP such as the O-SSP 120. The O-SSP 120 creates a billing record, for example, an original "Automatic Message Accounting" (AMA) record (O-AMA record) containing billing information for the call to be processed by that SSP. The billing record contains information related to the identity of the customer, call duration, type of call, call charges and/or other information that is needed to bill for the call. Upon receipt of a valid AIN trigger is encountered, the O-SSP 120 launches a query to the SCP 170. A valid AIN trigger may be an in-band trigger, such as an off-hook delay, or a specific digit string that is dialed by the calling party 110, such as one that begins with "8YY" (e.g., "800", "888", etc.). The SCP 170 receives the requested query from the O-SSP 120 and, based on the information provided by the O-SSP 120 (e.g., a customer message), the SCP 170 retrieves customer account information. It is recognized that the trigger may be an in-band trigger and/or an out-of-band trigger.

In an embodiment of the present invention, the SCP 170 may recognize that a service node (SN) is needed to process the call based on the customer account information. Under such conditions, the SCP 170 retrieves and forwards to the O-SSP 120 a message including the identity of the SN that can process the call. In one example, the SCP 170 may send an AIN Analyze_Route operation that may include the called party identification (CalledPartyID) parameter containing the address of the SN, such as the address of SN 175 to the O-SSP 120.

After the SCP 170 identifies the SN that can process the call, the O-SSP 120 sets up a first call with the identified SN 175 and sends a message instruction indicating the identity of the called party to be contacted by the SN 175. The O-SSP 120 can connect the call to, for example, the SN 175 using known ISDN call set-up procedures. To connect the call in this manner the O-SSP 120 sends a Q.931 SETUP message to create a link or leg B1 between the O-SSP 120 and the SN 175.

The calling party call is transferred to the SN 175 on the created leg B1. The SN 175 receives the first call established on leg B1 from the O-SSP 120 including the message instruction that indicates the identity of the called party, as shown in step 201. Using known ISDN call set-up procedures, the SN 175 establishes a second call through the O-SSP 120 to the identified called party, for example, the called party 160, as shown in step 203. The SN 175 creates a second link or leg B2 between the SN 175 and the called party 160, for the second call. After the leg B2 is established, the SN 175 internally bridges the B1 leg with the B2 leg to permit the calling party 110 to converse with the called party 160, as shown in step 205.

Referring to FIG. 2, in embodiments of the present invention, the SN 175 monitors the bridged call for signaling information during step 207. The signaling information may be either in-band or out-of-band digits or triggers that may identify a call feature type to be processed. The call feature type may be activated responsive to a called party request. In an embodiment of the present invention, the called party 160 may enter the in-band DTMF digits corresponding to the call feature type desired. Such call feature types include, for example, conference calling, call transfer, call forwarding, sequence dialing and/or any other suitable service or feature types.

After the SN 175 detects the signaling information or trigger for a corresponding call feature type, the SN 175 may process the call based on the call feature type detected in the signaling information, as shown in step 209. Examples of the call feature type, as processed by the SN 175, and the manner in which the SN 175 processes the feature will be described below in more detail.

As shown in step 211, the SN 175 processes the call in accordance with the call feature type desired and creates a billing module for the processed call. The billing module may include service values that include billing-related information for the processed call. After the SN 175 processes the call, the call may be merged back into the O-SSP 120, as shown in step 213. As shown in step 215, the SN 175 also sends the created billing module to the O-SSP when the call is merged into the O-SSP.

Examples of the call feature types including detailed billing procedures in accordance with an embodiment of the present invention will now be described. In embodiments of the present invention, the SN 175 may generate one or more AMA billing-modules containing appropriate billing information for the call as processed by the SN 175. The AMA module generated by the SN 175 may be referred to herein as the SN-AMA module. The service values included in the billing module may contain, for example, a call feature type identifier to identify the feature type processed (e.g., a call transfer feature, conference call feature, etc.), the dialed number for a target or third party, a time stamp to indicate the time of the call transfer, the duration of the transferred call and/or any other suitable information that may be needed to process a bill for the call processed by the SN 175.

As indicated above, such billing information may be contained in one or more modules that the SN creates. For example, the AMA modules generated by the SN 175 may include a "Service-Feature-Value1 Module" to indicate the feature type for the call. For example, Service-Feature-Value1 Module may indicate that the processed call is a transfer connect type call (i.e., call transfer). In alternate embodiments, the "Service-Feature-Value1 Module" may indicate that this is a conference call, call forward type call, or other feature type call. In embodiments of the present invention, the Service-Feature-Value1 Module may be forwarded to the O-SSP after the SN 175 has processed the call.

The SN 175 may also create additional modules such as a "Service-Feature-Value2 Module" and a "CdP-Disconnect Module" (CdP as used herein designates the called party). The Service-Feature-Value2 Module indicates when, for example, the call transfer or other feature occurs and the CdP-Disconnect Module may contain the date and/or time stamp of when the called party disconnected the call.

Figure 3:
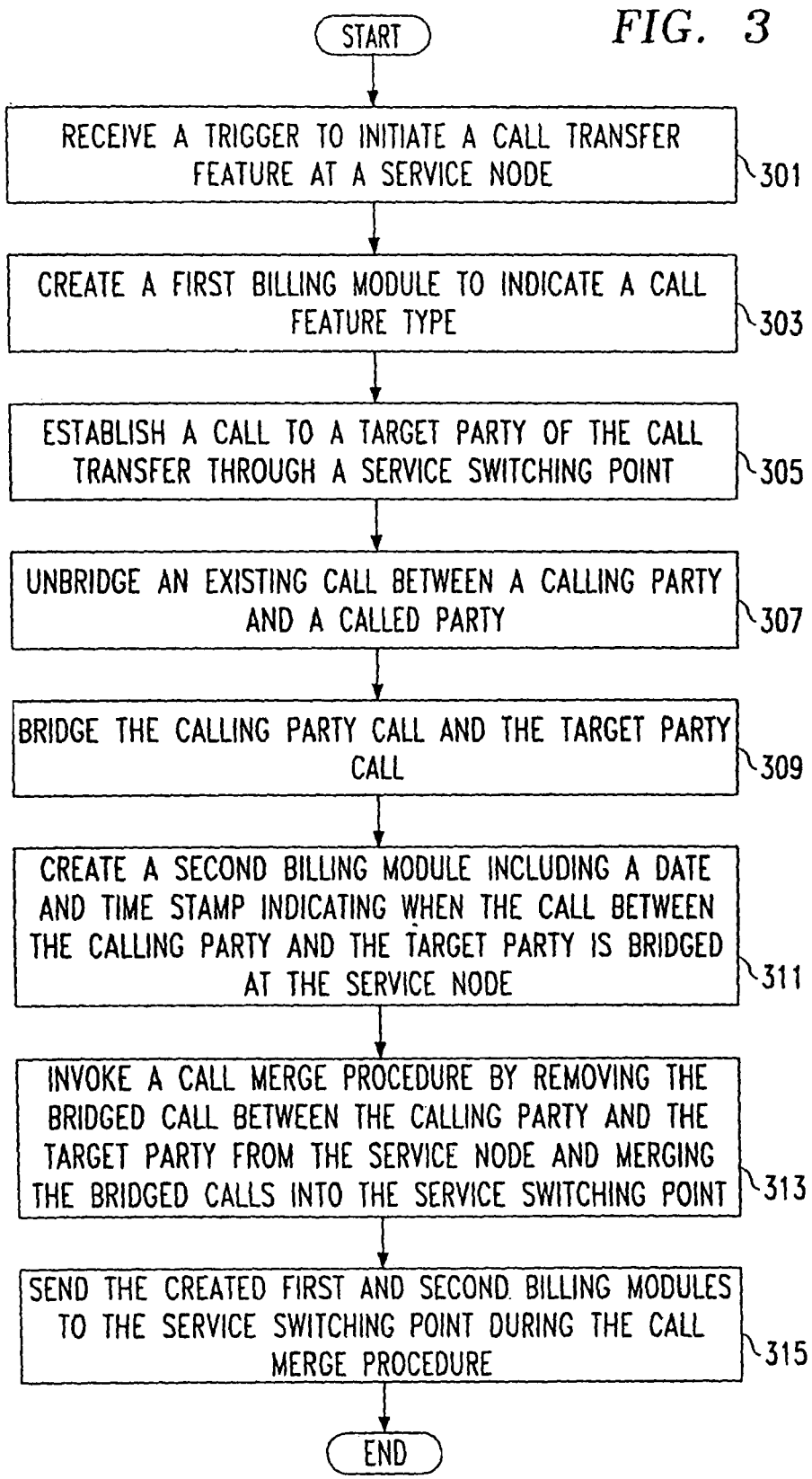
FIG. 3 is a flow chart illustrating the manner in which calls are processed in accordance with another embodiment of the present invention.

FIG. 3 is a flow chart illustrating the manner in which an exemplary feature type may be processed and billed in accordance with an embodiment of the present invention. In an embodiment of the present invention, the SN 175 may receive a trigger to initiate a call transfer feature during step 301. For example, the called party 160, in response to a request from the calling party 110, may enter an in-band dial tone multi-frequency (DTMF) trigger or an out-of-band trigger to initiate a call transfer. In accordance with embodiments of the present invention, the SN 175 creates a billing module such as a Service-Feature-Value1 Module (i.e., feature type identifier) to indicate that this is a call transfer or transfer-connect type call, as shown in step 303. It is recognized that the call transfer type feature is given by example only and that any other feature type can be processed in accordance with embodiments of the present invention.

In response to the trigger entered by the called party 160, the SN 175 establishes a third call through the O-SSP 120 with a third or target party 165, as shown in step 305. The third call may be established on a third leg B3 using known ISDN call set-up procedures. After the third call is established, the SN 175 transfers the call from the called party 160 to the target party 165. The SN 175 transfers the call by un-bridging the first call (i.e., leg B1) from the second call (i.e., B2) and bridges the first call (i.e., B1) with the third call (i.e., B3) during steps 307-309. The SN 175 may create a CdP-Disconnect Module including a date and/or time stamp (CdP-disconnect-date-time) indicating when the call between the calling party 110 to the called party 160 is disconnected or un-bridged at the service node. In embodiments of the present invention, the SN 175 may further create a Service-Feature-Value2 Module including a date and/or time stamp indicating when the call transfer occurs. In other words, the date and/or time stamp included in the Service-Feature-Value2 Module may indicate when the call between the calling party and the target party is bridged at the service node, as shown in step 311.

After the call transfer occurs, the SN 175 invokes a call merge procedure to merge the bridged call between the called party 110 and the target party 165 into the O-SSP 120, as shown in step 313. The SN 175 removes first leg B1 and the third leg B3 from the SN 175 and merges the call into the O-SSP 120. The SN 175 sends the SN-AMA modules (e.g., Service-Feature-Value 1 Module, CdP-Disconnect Module, Service-Feature-Value 2 Module, etc.) in the call merged into the O-SSP 120, as shown in step 315. The O-SSP 120 receives and appends the SN-AMA modules to the O-AMA record that was created by the O-SSP 120 for the call when originally received from the calling party 110.

The O-SSP 120 monitors the merged call between the calling party 110 and the target party 165. After the call between the calling party 110 and the target party 165 is completed, the O-SSP 120 passes the O-AMA record including the appended SN-AMA modules to the intermediary billing system 180. The intermediary billing system 180 receives the O-AMA record including the appended SN-AMA modules and performs calculations based on the information presented in the appended modules.

In an embodiment of the present invention, the intermediary billing system 180 may acquire the Service-Feature-Value1 Module that indicates the feature type for the call and the CdP-Disconnect Module containing the date and/or time stamp indicating when the call between the calling party 110 to the called party 160 is disconnected (i.e., CdP-disconnect-date-time). The intermediary billing system further acquires the connect date and time when the original call between the calling party 100 and called party 160 was connected (i.e., O-Connect-date-time) from the O-AMA record. The intermediary billing system may utilize the Service-Feature-Value1 Module to determine billing charges for the call. For example, a predetermined rate may be charged if the Service-Feature-Value1 Module indicates that the call transfer service has been used. Further, the intermediary billing system may calculate the elapsed time of the call between the calling party 110 and the called party 160 (CdP-elapsed-date-time) based on the information included in the various billing modules.

The intermediary billing system 180 calculates the CdP-elapsed-date-time by subtracting the O-Connect-date-time from the CdP-disconnect-date-time the time (e.g., CdP-elapsed-date-time=CdP-disconnect-date-time−O-Connect-date-time). For example, if the O-AMA record has a O-Connect-date-time of 7:00 AM and a CdP-disconnect-date-time of 7:15 AM, then the CdP-elapsed-date-time would be 15 minutes for the duration of the call. Accordingly, the intermediary billing system 180 and/or the end billing system 190 could bill either the calling party and/or the called party for the call between the calling party 110 and the called party 160.

It is recognized that the intermediary billing system 180 may calculate other billing information based on the O-AMA record including the appended SN-AMA modules. For example, the intermediary billing system may calculate the duration of the call between the calling party 110 and the target party 165 based on the billing modules received from the O-SSP 120.

Figure 4:
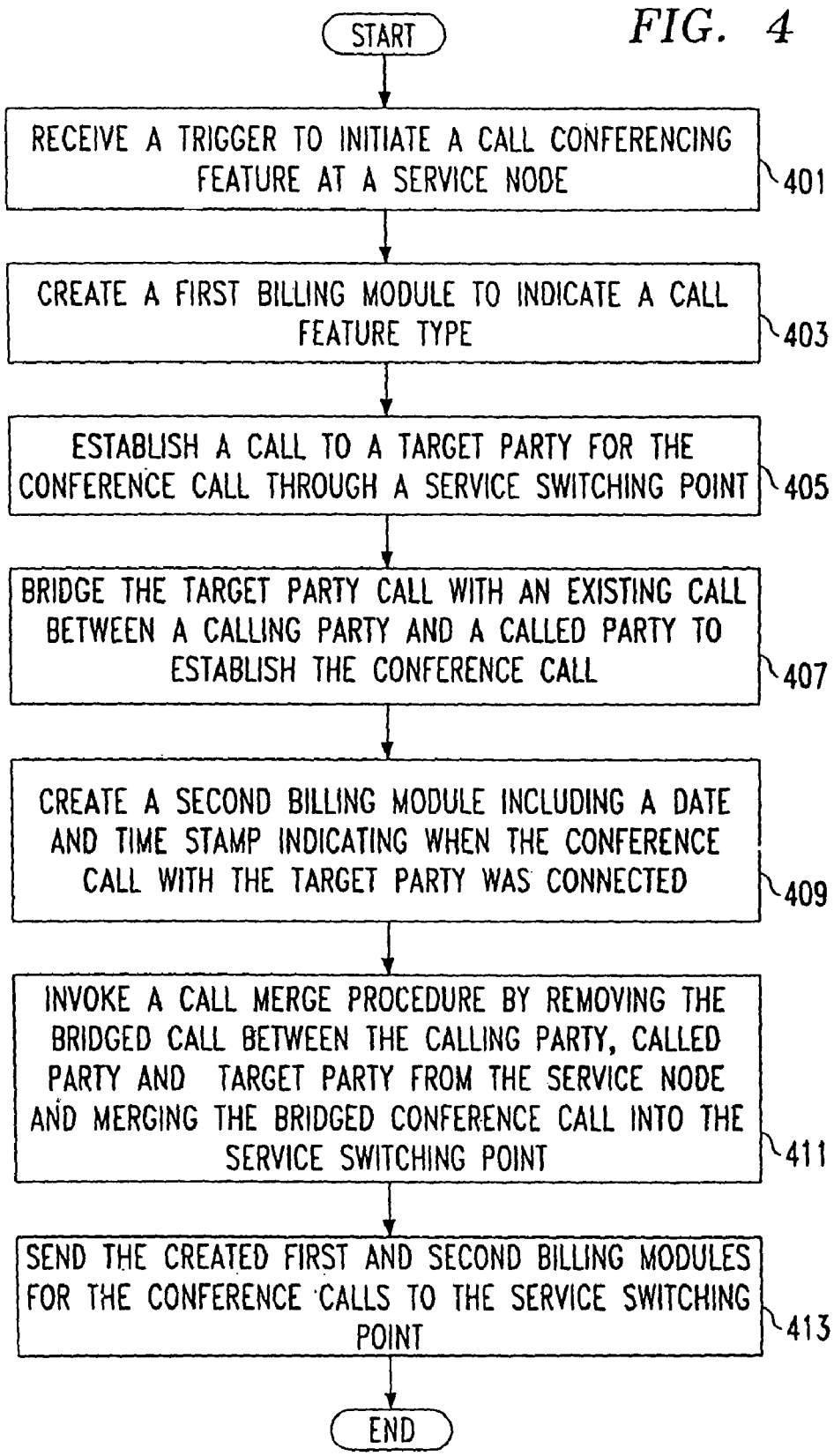
FIG. 4 is a flow chart illustrating the manner in which calls are processed in accordance with yet another embodiment of the present invention.

FIG. 4 is a flow chart illustrating the manner in which an exemplary feature type may be processed and billed in accordance with an embodiment of the present invention. In an alternative exemplary embodiment of the present invention, the SN 175 may receive a trigger to initiate a call conference feature. For example, the called party 160, in response to a request from the calling party 110, may enter an in-band dial tone multi-frequency (DTMF) trigger or an out-of-band trigger to initiate a call conferencing feature to conference the target party 165 in the current call between the calling party 110 and the called party 160, as shown in step 401. In accordance with embodiments of the present invention, the SN 175 creates a module such as a Service-Feature-Value1 Module (i.e., feature type identifier) to indicate that this is a call conference type call, as shown in step 403.

In response to the trigger entered by the called party 160, the SN 175 establishes a third call through the O-SSP 120 with a third or target party 165, as shown in step 405. The third call may be established on a third leg B3 using known ISDN call set-up procedures. After the third call is established, the SN 175 bridges the call established with the target party 165 with the existing bridged call between the calling party 110 and the called party 160. The SN 175 bridges or conferences the first call (i.e., leg B1), the second call (i.e., B2) and the third call (i.e., B3) so that call conferencing between the calling party 110, the called party 160 and target party 165 can occur, as shown in step 407. The SN 175 then creates a Target Party Connect Module (TP-Connect Module) including a date and/or time stamp (TP-connect-date-time) indicating when the conference call with the target party 165 was connected or bridged, as shown in step 409.

After call conferencing occurs, the SN 175 invokes a call merge procedure to merge the conference call between the called party 110, the calling party 160 and the target party 165 into the O-SSP 120. The SN 175 removes the first leg B1, the second leg B2 and the third leg B3 from the SN 175 and bridges the conference call through the O-SSP 120, as shown in step 411. It is recognized that conference calls including additional parties can also be established by the service node 175. For example, the SN 175 may establish a fourth leg B4 (not shown) with another target party and may bridge the fourth leg with the previously established conference call. The SN 175 may create additional billing modules with a date and/or time stamp indicating when additional parties have been included in the conference call. This information may be used by the billing system to bill each party for the call or for other billing purposes.

The SN 175 sends the SN-AMA module including the one or more modules (e.g., Service-Feature-Value 1 Module, TP-Connect Module, etc.) in the call merged into the O-SSP 120, as shown in step 413. The O-SSP 120 receives and appends the SN-AMA modules to the O-AMA record that was created by the O-SSP 120 for the call when originally received from the calling party 110.

The O-SSP 120 monitors the conference call between the calling party 110, the called party 160 and the target party 165. After the conference call is completed, the O-SSP 120 passes the O-AMA record including the appended SN-AMA modules to the intermediary billing system 180. The intermediary billing system 180 receives the O-AMA record including the appended SN-AMA modules and performs billing calculations based on the information presented in the appended modules.

In another exemplary embodiment of the present invention, the intermediary billing system 180 may acquire the Service-Feature-Value1 Module that indicates the feature type for the call and the TP-Connect Module containing the date and/or time stamp indicating when the target party was connected into conference call (i.e., TP-connect-date-time). The intermediary billing system further acquires the connect date and time when the original call between the calling party 110 and the called party 160 was connected (i.e., O-Connect-date-time) from the O-AMA record. The intermediary billing system may utilize the Service-Feature-Value1 Module to determine billing charges for the call. For example, a predetermined rate may be charged if the Service-Feature-Value1 Module indicates that the call conference service has been used. Further, the intermediary billing system may calculate the elapsed time of the call between the calling party 110 and the called party 160 (CdP-pre-conference-date-time) prior to the conference call to the target party 165 was connected based on the information included in the various billing modules.

The intermediary billing system 180 calculates the CdP-elapsed-date-time by subtracting the O-Connect-date-time from the TP-connect-date-time the time (i.e., CdP-pre-conference-date-time=TP-connect-date-time−O-Connect-date-time). For example, if the O-AMA record has a O-Connect-date-time of 7:00 AM and a TP-connect-date-time of 7:05 AM, then the CdP-pre-conference-date-time would be 5 minutes for the duration of the call between the calling party 110 and the called party 160. Accordingly, the intermediary billing system 180 and/or the end billing system 190 could bill either the calling party and/or the called party separately for the pre-conference call between the calling party 110 and the called party 160.

It is recognized that the intermediary billing system 180 may calculate other billing information based on the O-AMA record including the appended SN-AMA modules. For example, the intermediary billing system may calculate the duration of the conference call between the calling party 110, called party 160 and the target party 165 based on the billing modules received from the O-SSP 120. For example, the O-SSP 120 may provide the date and/or time stamp when the conference call was terminated or disconnected (CC-disconnect-date-time) and, based on this information, the time of the conference call may be calculated. The intermediary billing system 180 calculates the conference call elapsed time (CC-elapsed-date-time) by subtracting the TP-connect-date-time the time from the CC-disconnect-date-time (i.e., CC-elapsed-date-time=CC-disconnect-date-time−TP-connect-date-time). For example, if the O-AMA record has an TP-connect-date-time of 7:05 AM and CC-disconnect-date-time of 7:25 AM, then the CC-elapsed-date-time would be 20 minutes for the duration of the conference call. Accordingly, the intermediary billing system 180 and/or the end billing system 190 could bill either the calling party, called party and/or the target party separately for the conference call.

It is recognized that the feature types described above have been given by way of example only and one of ordinary skill in the art can employ the present invention to other feature types in the manner described above. In addition, the intermediary billing systems 180 manipulate and utilize the information included in the O-AMA record including the appended SN-AMA modules in different ways to achieve different billing information that can be used to bill the call. Examples of other types of information that may be included in the modules may include account codes, sub-account codes, tracer counts, carrier access information, egress information, other feature codes, multiple features, etc.

Several embodiments of the present invention are specifically illustrated and/or described herein. However, it will be appreciated that Modifications and variations of the present invention are covered by the above teachings and within the purview of the appended claims without departing from the spirit and intended scope of the invention.

What is claimed is:

1. A system for billing for services provided by a network comprising:
    a node in the network located on a call path between a calling party and a called party;
    a service node configured to
        bridge within the network a first call made by the calling party with a second call established to the called party to create a bridged call,
        process the bridged call in accordance with signaling information associated therewith to create a processed call,
        create a billing module for the processed call that includes billing information associated therewith, and
        merge the processed call and said billing module into the node.

2. The system of claim 1, wherein said node comprises a service switching point.

3. The system of claim 1, wherein the signaling information comprises a trigger to initiate a call transfer feature, and the service node is configured to process the call by establishing a third call with a target party responsive to the call transfer trigger, un-bridging the first call from the second call, and bridging the first call with the third call, wherein the billing module includes service values related to billing information for the call transfer feature.

4. The system of claim 3, wherein the service node is further configured to invoke a call merge procedure to merge the bridged first and third calls along with the billing module into the network.

5. The system of claim 3, wherein the service values include a telephone number for the target party.

6. The system of claim 3, wherein the service values include a time stamp that indicates the time when the first and second calls were un-bridged.

7. The system of claim 6, wherein the time stamp further indicates when the first and third calls were bridged.

8. The system of claim 1, wherein the signaling information comprises a trigger to initiate a call conferencing feature and the service node is further configured to process the call based on the signaling information by establishing a second call and a third call through a service switching point and bridging the first, second and third calls with each other, wherein the billing module includes service values related to billing information for the call conferencing feature.

9. The system of claim 8, wherein the service node is further configured to invoke a call merge procedure to merge the bridged calls along with the billing module into the network.

10. The system of claim 8, wherein the service values include telephone numbers for the second and third calls.

11. The system of claim 8, wherein the service values include a time stamp that indicates when the first, second and third calls were merged.

12. The system of claim 1, further comprising
a billing system; and
a service switching point in communication with said billing system and configured to
receive the created billing module,
append the billing module to a billing record for the first call, and
send the billing record including the appended billing module to the billing system for generating a bill.

13. A system for billing for services offered by an advanced intelligent network (AIN), the system comprising:
a service switching point; and
a service node in communication with the service switching point and configured to
receive a trigger to initiate a call transfer feature,
create a first billing module to identify the call transfer feature,
establish a call to a target party of the call transfer through the service switching point,
unbridge an existing call between a calling party and a called party,
bridge the calling party call and the established target party call,
create a second billing module including a date and time stamp indicating when the call between the calling party and the target party is bridged,
invoke a call merge procedure by removing the bridged call between the calling party and the called party and merge the bridged calls into the service switching point, and
send the created first and second billing modules to the service switching point during the call merge procedure.

14. The system of claim 13, wherein the service switching point is further configured to receive the created billing modules, append the billing modules to a billing record for the calling party call and send the billing record including the appended billing modules to the billing system for generating a bill.

15. The system of claim 14, further comprising a service control point configured to store information.

16. The system of claim 15, wherein the service switching point is further configured to
receive the calling party call,
create the billing record for the calling party call, the billing record containing the billing information for the calling party call,
responsive to an AIN trigger from the calling party, launch a query to the service control point,
receive an address for the service node, and
send the calling party call to the service node identified by the address.

17. A system for billing for services offered by an advanced intelligent network (AIN), the system comprising:
a service switching point; and
a service node in communication with the service switching point and configured to
receive a trigger to initiate a call conferencing feature,
create a first billing module to identify the call conferencing feature,
establish a call to a target party for the conference call through the service switching point,
bridge the established target party call with an existing call between a calling party and a called party to establish the conference call,
create a second billing module including a date and time stamp indicating when the conference call with the target party was connected,
invoke a call merge procedure by removing the bridged call between the calling party, the called party and the target party and merge the bridged conference call into the service switching point, and
send the created first and second billing modules to the service switching point during the call merge procedure.

18. The system of claim 17, wherein the service switching point is configured to
receive the created billing modules;
append the billing modules to a billing record for the calling party call; and
send the billing record including the appended billing modules to a billing system for generating a bill.

19. The system of claim 18, wherein the service switching point is further configured to
receive the calling party call,
create the billing record for the calling party call, the billing record containing billing information for a calling party call;
responsive to an AIN trigger from the calling party, launch a query to a service control point;
receive an address for the service node; and
send the calling party call to the service node identified by the address.

* * * * *